(12) United States Patent
Kniess et al.

(10) Patent No.: US 7,611,574 B2
(45) Date of Patent: Nov. 3, 2009

(54) INTERFERENCE PIGMENT WITH A HIGH COVERING POWER

(75) Inventors: Helge Kniess, Weiterstadt (DE); Gerhard Pfaff, Muenster (DE); Klaus Bernhardt, Groβ-Umstadt (DE)

(73) Assignee: Merck Patent Gesellschaft Mit Beschrankter Haftung, Darmstadt (DE)

( * ) Notice: Subject to any disclaimer, the term of this patent is extended or adjusted under 35 U.S.C. 154(b) by 269 days.

(21) Appl. No.: 10/555,592

(22) PCT Filed: May 5, 2004

(86) PCT No.: PCT/EP2004/004762

§ 371 (c)(1),
(2), (4) Date: Oct. 10, 2006

(87) PCT Pub. No.: WO2004/099319

PCT Pub. Date: Nov. 18, 2004

(65) Prior Publication Data

US 2007/0028799 A1    Feb. 8, 2007

(30) Foreign Application Priority Data

May 8, 2003    (DE) .............................. 103 20 455

(51) Int. Cl.
   *C09C 1/00* (2006.01)
(52) U.S. Cl. .................. 106/439; 106/415; 106/416; 106/417; 427/215; 427/218; 428/403; 428/404
(58) Field of Classification Search ............... 106/415, 106/416, 417, 439; 427/215, 218; 428/403, 428/404
See application file for complete search history.

(56) References Cited

U.S. PATENT DOCUMENTS

| 3,087,828 | A |   | 4/1963  | Linton et al. |         |
|-----------|---|---|---------|---------------|---------|
| 4,867,793 | A | * | 9/1989  | Franz et al.  | 106/415 |
| 5,009,711 | A |   | 4/1991  | Emmert et al. |         |
| 5,958,125 | A |   | 9/1999  | Schmid et al. |         |
| 5,972,098 | A | * | 10/1999 | Andes et al.  | 106/436 |
| 6,238,471 | B1| * | 5/2001  | Vogt et al.   | 106/417 |
| 6,280,520 | B1|   | 8/2001  | Andes et al.  |         |
| 6,508,876 | B1| * | 1/2003  | Bernhardt et al. | 106/415 |
| 6,596,070 | B1| * | 7/2003  | Schmidt et al. | 106/417 |
| 6,599,355 | B1| * | 7/2003  | Schmidt et al. | 106/417 |
| 6,689,205 | B1| * | 2/2004  | Bruckner et al. | 106/415 |
| 6,840,993 | B2| * | 1/2005  | Schmidt et al. | 106/417 |
| 6,884,289 | B2| * | 4/2005  | Schoen et al.  | 106/415 |

FOREIGN PATENT DOCUMENTS

| DE | 36 17 430    A  | 11/1987 |
|----|------------------|---------|
| DE | 36 17 430    A1 | 11/1987 |
| DE | 196 18 563   A1 | 11/1997 |
| DE | 196 18 569   A1 | 11/1997 |
| DE | 198 03 550   A1 | 8/1999  |
| DE | 198 17 286   A1 | 10/1999 |
| DE | 199 51 871   A1 | 5/2001  |
| DE | 100 61 178   A1 | 6/2002  |
| EP | 0 307 747    A  | 3/1989  |
| EP | 0 950 693    A  | 10/1999 |
| EP | 1 028 146    A1 | 8/2000  |
| EP | 1 254 928    A1 | 11/2002 |
| JP | 06-184461    A  * | 7/1994 |
| WO | WO 99/20695     | 4/1999  |

OTHER PUBLICATIONS

Machine Translation of JP06-184461A (Jul. 1994).*

* cited by examiner

*Primary Examiner*—Anthony J Green
(74) *Attorney, Agent, or Firm*—Millen, White, Zelano & Branigan, P.C.

(57) ABSTRACT

The invention relates to an interference pigment with a high covering power, comprising at least one $FeTiO_3$-containing layer, which is applied to a lamellar inorganic substrate and whose thickness and absorbing power can be precisely set. The invention also relates to a method for producing this interference pigment and to the use thereof.

10 Claims, No Drawings

INTERFERENCE PIGMENT WITH A HIGH COVERING POWER

The invention relates to an interference pigment having high hiding power which has at least one $FeTiO_3$-containing layer whose thickness and absorption capacity can be set precisely on a flake-form inorganic substrate.

Lustre or effect pigments, which have interference phenomena, are employed in a wide variety of areas. Pigments of this type have become indispensable in automobile paints, decorative coatings of all types and in the colouring of plastics, paints and printing inks and in applications in cosmetics.

Ideally, the pigments are aligned parallel to the surface in the particular application medium and develop their optical effect through a complex interplay of interference, reflection, transmission and absorption of the incident light (G. Pfaff, P. Reynders, Chem. Rev. 99 (1999) 1963-1981; G. Pfaff et al., "Industrial Inorganic Pigments", $2^{nd}$ Edition, ed. by G. Buxbaum, Wiley-VCH, 1988). However, the focus of the desired optical effect is dependent on the specific area of application and is often on bright colouring, varying brightness impressions, metal effects, change of various colours dependent on the viewing angle and the like. In virtually all cases, high lustre is desired. However, various effects can rarely be combined with one another in a single pigment without problems, and consequently the desired effects can only be achieved through special pigment mixtures or other complex measures.

Silver-grey hues, in particular, are popular and extend the range in effect pigments, preferably in the automobile sector. These have high hiding power if metal pigments or pigments having metal layers are employed. Use is therefore frequently made of aluminium pigments, but these may have stability problems in the conventional application systems, particularly in the outdoor area. In addition, the lustre that can be achieved therewith is very hard and "metallic", which is not regarded as advantageous in all areas of application. By contrast, transparent interference pigments, in which the hue is generated merely by interference phenomena at, preferably, metal oxide layers on flake-form inorganic substrates, have high, but soft lustre, but not satisfactory hiding power.

For example, DE 100 61 178 describes a transparent silver pigment which consists of an interference system comprising high- and low-refractive-index layers on a transparent substrate. The silver hue is generated via defined, mutually matched layer thicknesses of the multilayered system. It is thus possible to obtain a pale hue and soft lustre. Such pigments have insignificant hiding power, but this would be entirely desirable in the case of pigments which are intended for use in very thin layers.

In order to be able to generate a high, but soft lustre effect and also high hiding power with a single pigment, solutions have already been proposed in which metal substrates have been coated with interference systems or transparent substrates have been coated with reflective layers, at least one of which consists of a selectively or non-selectively absorbent material.

For the preparation of coloured pigments having high hiding power, the thickness and absorption capacity of the individual layers must be precisely matched to one another here. This is a complex process, in particular if the absorbent layers consist of metals.

However, absorbent layers can also be produced by means of coloured metal oxides or mixed oxides.

Thus, DE 36 17 430 discloses pigments which have, on a transparent substrate, an iron(II) oxide-containing coating which can exhibit interference phenomena, depending on its layer thickness, and provides the pigments with a very dark mass tone.

A pigment is described for the preparation of which a $TiO_2$ layer and then an $Fe_2O_3$ layer are deposited on a mica substrate and which is subsequently reduced at high temperatures. Muscovite mica, $TiO_2$ and ilmenite ($FeTiO_3$) can be detected in the Debye-Scherrer diagram for this pigment. The pigment exhibits a dark-blue hue which augments and darkens the blue interference colour of the intermediate mica/$TiO_2$ pigment.

DE 198 17 286 describes a multilayered pearlescent pigment based on an opaque substrate which is coated with alternating layers of a material of low refractive index and a material of high refractive index or a metal, where the difference between the refractive indices is at least 0.1. At least three further layers, preferably consisting of metal oxides, are applied to the opaque substrate here. The opaque substrate employed can be an ilmenite-coated mica pigment. This is prepared by coating the mica with a $TiO_2$ layer and then with an $Fe_2O_3$ layer. The product is subsequently calcined at above 800° C. in a reducing atmosphere, during which an ilmenite layer forms.

DE 196 18 563 describes single- or multilayered titanate-containing pearlescent pigments which consist of iron titanate and optionally titanium dioxide and/or iron oxide. The iron titanate may be ilmenite. In this case, the pigment is prepared by a process in which a thermally hydrolysable titanium compound is applied as a thin film to a continuous belt and solidified, titanium dioxide is formed by a chemical reaction, the resultant layer is detached from the belt, and the titanium dioxide flakes obtained are coated with iron oxide and subsequently calcined at at least 500° C. in a reducing atmosphere.

The ilmenite layers of the pigments obtained in the three last-mentioned patent applications have therefore each been produced by one and the same principle, namely deposition of a $TiO_2$ layer, optionally on a substrate, subsequent deposition of an iron(III) oxide layer and subsequent reducing treatment at high temperatures. The reducing treatment results in the formation of a mixed oxide consisting of ilmenite ($FeTiO_3$) at the interface between the $TiO_2$ layer and the $Fe_2O_3$ layer. The reaction conditions generally cannot be set here in such a way that a single layer of the desired mixed oxide can be obtained from the two layers applied one on top of the other. Instead, it must be expected that at least some of the $TiO_2$ layer remains unchanged. It also cannot be excluded that small amounts of unreacted $Fe_2O_3$ remain in the layer system, which, owing to its inherent colour, can have an adverse effect on the desired colour impression of the pigment and the absorption behaviour thereof. A certain gradient with respect to the $FeTiO_3$ content in the coating thus forms. This may be desirable in some cases, since the residual $TiO_2$ layer remaining itself contributes to the interference of the system as a whole. However, interference effects are only particularly effective and well controllable and calculable if very smooth separate layers of defined thickness and refractive index are present in the system. Pigments prepared by the above-mentioned processes do not have a layer structure with clearly defined layers of certain thickness and composition.

There was therefore a demand for pigments having $FeTiO_3$-containing layers whose thickness and absorption capacity are readily adjustable.

The invention was thus based on the object of providing interference pigments comprising flake-form inorganic substrates having $FeTiO_3$-containing layers which have high hiding power, high lustre and optionally a colour change at varying viewing angles and which can be prepared by means of a simple process in which both the composition and the layer thickness of the individual layers can be set precisely, a process for the preparation thereof, and the use thereof.

The object according to the invention is achieved by an interference pigment having high hiding power, comprising a flake-form inorganic substrate and at least one $FeTiO_3$-containing layer thereon, where the $FeTiO_3$ is present in a proportion of 8-100% by weight, based on the total weight of the layer, and is homogeneously distributed in the layer.

The object according to the invention is furthermore achieved by a process for the preparation of an interference pigment which comprises the simultaneous addition of suitable amounts of a water-soluble inorganic titanium compound and of a water-soluble inorganic iron compound to an aqueous suspension of a flake-form inorganic substrate at a temperature and in a pH range which are sufficient simultaneously to deposit both a titanium(IV) oxide hydrate and also an iron(III) oxide hydrate on the substrate surface, and subsequent thermal treatment under reducing conditions, giving a coating having a proportion by weight of 8-100% by weight of $FeTiO_3$.

In particular, the object according to the invention is achieved by a process for the preparation of an interference pigment which comprises a flake-form, inorganic substrate and at least one $FeTiO_3$-containing layer thereon, where the substrate is suspended in water, a water-soluble inorganic titanium compound and a water-soluble inorganic iron compound in a molar ratio of 1:0.05 to 1:1, based on the oxides $TiO_2$ and $Fe_2O_3$, are added simultaneously to the suspension, at a temperature of 50 to 100° C. and a pH kept constant in the range from 1.4 to 4.0, during which the corresponding oxide hydrates are deposited on the substrate surface as a mixture, the coated substrate is separated off and, if desired, washed and dried, and thermally treated at temperatures in the range from 500° C. to 1200° C. under reducing conditions.

In addition, the object according to the invention is achieved by the use of the above-described interference pigment having high hiding power, which comprises a flake-form, inorganic substrate and at least one $FeTiO_3$-containing layer thereon, in paints, coatings, printing inks, plastics, cosmetic formulations, ceramic materials, glasses, paper, for laser marking, in security applications and in dry preparations and pigment compositions.

Inorganic, flake-form substrates which can be employed are all suitable transparent materials which are in flake form, for example phyllosilicates, such as natural or synthetic mica, talc and kaolin, but also glass flakes, silicon dioxide flakes, titanium dioxide flakes, flake-form iron oxide or aluminium oxide, graphite flakes, BiOCl, holographic pigments, liquid crystal polymers (LCPs) and the like. Preference is given to natural or synthetic mica, glass, silicon dioxide and aluminium oxide and particular preference is given to natural mica.

The size of these substrates is not crucial per se and depends on the particular area of application. The substrates generally have a thickness of between 0.05 and 5 µm, in particular between 0.1 and 4.5 µm. The length or width dimension is usually between 1 and 250 µm, preferably between 2 and 200 µm and in particular between 2 and 100 µm.

It is essential to the invention that the $FeTiO_3$-containing layer is in the form of a smooth, homogeneous layer and its thickness and composition can be set in a defined manner. It can, for example, be located directly on the substrate or on layers, preferably composed of high- or low-refractive-index metal oxides or metal oxide hydrates, of metal fluorides or BiOCl, already located on the substrate. It is not necessary here for the layer located immediately beneath the $FeTiO_3$-containing layer to consist of titanium dioxide, as is known to date from the prior art. Instead, the desired optical effect decides on the presence and composition of the layers also present in addition to the $FeTiO_3$-containing layer.

The composition of the $FeTiO_3$-containing layer is set via the molar ratio of the water-soluble, inorganic titanium and iron compounds to be employed for the coating, in each case calculated as $TiO_2$ and $Fe_2O_3$. The proportion of $FeTiO_3$ in the layer here is 8-100% by weight, based on the total weight of the layer. In particular, the proportion of $FeTiO_3$ is 15-99% by weight and preferably 54-99% by weight, in each case based on the total weight of the layer.

The molar ratio of the titanium and iron compounds employed, in each case calculated as $TiO_2$ and $Fe_2O_3$, is 1:0.05 to 1:1, but in particular 1:0.25 to 1:0.5.

The water-soluble, inorganic compounds employed are preferably chlorides, sulfates or nitrates of titanium or iron, but in particular chlorides and sulfates.

In the case of a ratio of the starting components of 1:0.5, in each case calculated on the deposited amount of $TiO_2$ and $Fe_2O_3$, for the production of the $FeTiO_3$-containing layer, this consists of pure ilmenite ($FeTiO_3$). Such layers have a grey inherent colour and a defined refractive index (n=2.4). However, if the starting components are present with a calculated excess of $TiO_2$, small amounts of $TiO_2$ are also present in the $FeTiO_3$-containing layer, distributed uniformly over the entire layer thickness.

The included oxide differs in colour and refractive index from ilmenite and is therefore particularly suitable for establishing additional desired optical effects. Thus, for example, $TiO_2$ included in the $FeTiO_3$-containing layer in pigments having a silver-grey mass tone can result in an additional effect which additionally provides the pigment with a golden shimmer. An excess of $TiO_2$ in the $FeTiO_3$-containing layer is therefore preferred in addition to a layer of pure ilmenite.

Furthermore, one or more further metal oxides may also be included in the $FeTiO_3$-containing layer. These are selected, for example, from $Al_2O_3$, $Ce_2O_3$, $B_2O_3$, $ZrO_2$ and/or $SnO_2$ and increase the tinting strength of this layer. However, their proportion by weight is not greater than 20% by weight, in particular not more than 10% by weight, based on the total weight of the layer. If the use of further metal oxides of this type is considered, the proportion by weight should, however, not be less than 1% by weight for reasons of efficacy.

The thickness of the $FeTiO_3$-containing layer is determined by the total weight of the starting materials. The absorption capacity of the layer can thus be set precisely. In particular, the deposition of relatively thick $FeTiO_3$-containing layers is possible in an advantageous manner. The thickness of this layer is generally 1 to 300 nm and preferably 5 to 100 nm.

The homogeneity, smoothness and composition of the $FeTiO_3$-containing layer of the pigment according to the invention is determined essentially by the process for the production thereof. By contrast, homogeneous and smooth $FeTiO_3$-containing layers of defined composition, and thus the pigments according to the invention, cannot be prepared using the process principle known from the prior art of successive deposition of a $TiO_2$ layer and an $Fe_2O_3$ layer with subsequent reduction. In addition, the interfacial reduction in the prior art generally results in only very thin $FeTiO_3$-containing layers.

The pigments according to the invention, which have homogeneous and smooth separate layers and comprise an $FeTiO_3$-containing layer on a flake-form support, are prepared by a process in which suitable amounts of a water-soluble inorganic titanium compound and a water-soluble inorganic iron compound are added simultaneously to an aqueous suspension of a flake-form inorganic substrate, and a coating is obtained at a temperature and in a pH range which are sufficient simultaneously to deposit both a titanium(IV) oxide hydrate and an iron(III) oxide hydrate on the substrate surface, and the coating is subjected to subsequent thermal treatment under reducing conditions, giving a coating having a proportion by weight of 8-100% by weight of $FeTiO_3$.

The pigments according to the invention are preferably prepared by a process in which a flake-form substrate is suspended in water, a water-soluble inorganic titanium compound and a water-soluble inorganic iron compound in a molar ratio of 1:0.05 to 1:1, based on the oxides $TiO_2$ and $Fe_2O_3$, are added simultaneously to the suspension at a temperature of 50 to 100° C. and a pH kept constant in the range from 1.4 to 4.0, during which the corresponding oxide hydrates are deposited on the substrate surface as a mixture, the coated substrate is separated off and, if desired, washed and dried, and thermally treated at temperatures in the range from 500° C. to 1200° C. under reducing conditions.

In order to achieve uniform deposition of the titanium oxide hydrate and iron oxide hydrate on the substrate, the temperature of the suspension is adjusted to and held at 50 to 100° C. and preferably 70 to 80° C.

The pH of the suspension is adjusted to a value between 1.4 and 4.0, in particular to a value between 1.5 and 3.0 and particularly preferably to a value between 1.7 and 2.0, and kept constant by addition of aqueous solutions of acids or bases. It is essential here that the pH is adjusted in such a way that both the titanium oxide hydrate and the iron oxide hydrate and also any further metal oxide hydrates are deposited simultaneously, uniformly and completely on the substrate surface so that a high-quality layer of homogeneous composition is formed.

Possible further metal oxide hydrates are those of aluminium, cerium, boron, zirconium and/or tin. These are obtained by adding water-soluble, inorganic compounds of these elements to the suspension at the same time as the starting solutions of titanium compounds and iron compounds. Their proportion by weight is not greater than 20% by weight, in particular not greater than 10% by weight, based on the respective oxides and the total weight of the layer. The water-soluble inorganic compounds employed are preferably chlorides, sulfates or nitrates, but in particular chlorides and sulfates. It is advantageous here for the compounds of titanium, iron and the further metals to belong to the same class of compound.

The solutions of the titanium compound and of the iron compound are employed in a molar ratio of 1:0.05 to 1:1, in particular 1:0.25 to 1:0.5. They are preferably mixed here, but can also be added separately, but simultaneously, to the suspension comprising the substrate.

The solution of the titanium compound and a solution of one or more further metal compounds are employed in such a way that a molar ratio of 1:0 to 1:0.5, in particular 1:0.1 to 1:0.3, based on $TiO_2$ and one or more further metal oxides from the group of $Al_2O_3$, $Ce_2O_3$, $B_2O_3$, $ZrO_2$ and $SnO_2$, arises. Here too, the further metal compounds can be added separately, but simultaneously, in a solution or mixed in advance with the solution of the titanium compound and/or the solution of the iron compound.

The coated substrate is subsequently separated off from the suspension and, if desired, washed and dried.

A thermal treatment under reducing conditions is subsequently carried out at a temperature in the range from 500 to 1200° C., preferably at 600 to 1000° C. The temperature is particularly preferably in the range from 700 to 900° C.

The reduction is advantageously carried out in forming gas ($N_2/H_2$).

As already mentioned above, it is not a prerequisite that the $FeTiO_3$-containing layer is located directly on the substrate. Instead, one or more layers, preferably composed of metal oxides, metal oxide hydrates or mixtures thereof, of $MgF_2$ or of BiOCl, may also be located on the substrate. It is possible for a layer of this type to be located directly on the substrate or directly on the $FeTiO_3$-containing layer.

The layers can have a high (n>1.8) or low (n≦1.8) refractive index.

These layers are advantageously composed of non-absorbent materials. Non-absorbent materials having a high refractive index are $TiO_2$, $ZrO_2$, ZnO, $SnO_2$, mixtures thereof or BiOCl, where $TiO_2$ is particularly preferred. Non-absorbent materials having a low refractive index are $SiO_2$, $SiO(OH)_2$, $Al_2O_3$, AlO(OH), $B_2O_3$, mixtures thereof or $MgF_2$. $SiO_2$ is particularly preferred.

In an embodiment, the interference pigment according to the invention comprises at least one layer package consisting of a layer of non-absorbent material having a refractive index of n≦1.8 and a layer of non-absorbent material having a refractive index of n>1.8. The individual layers here are composed of the materials listed above.

This layer package can either be located between the substrate and the $FeTiO_3$-containing layer or directly on the $FeTiO_3$-containing layer. It can have been applied one or more times.

It is preferably present once and is located on the $FeTiO_3$-containing layer.

In a further embodiment, the pigment according to the invention also comprises at least one further $FeTiO_3$-containing layer which is separated from the first $FeTiO_3$-containing layer by at least one layer of the above-mentioned materials. Particular preference is given to the embodiment which has two $FeTiO_3$-containing layers and in which at least one layer package comprising a layer of non-absorbent material having a refractive index of n≦1.8 and a layer of non-absorbent material having a refractive index of n>1.8 is located between the first and second $FeTiO_3$-containing layers. It is particularly advantageous for all $FeTiO_3$-containing layers to be applied by the same process and thus to be of homogeneous composition and of defined thickness and absorption capacity. It goes without saying here that the second or each further $FeTiO_3$-containing layer may also comprise a small proportion of less than 20% by weight and preferably less than 10% by weight of further metal oxides, as already described above.

A pigment having a layer structure of this type has particularly high hiding power at the same time as high lustre.

Correct matching of material and layer thicknesses of all layers located on the flake-form substrate enables pigments having high hiding power and bright interference colours to be obtained. In particular, it is also possible to obtain silver-coloured pigments having a very pale and pure mass tone which have high hiding power and at the same time high lustre. These pigments are very much more aesthetically attractive than the pigments having ilmenite layers known from the prior art which have been prepared by the processes conventional to date.

The layers of low-refractive-index material having a refractive index of n≦1.8 have layer thicknesses of between 20 and 300 nm, preferably between 20 and 200 nm. By means of the layer thickness of the low-refractive-index layers, it can also be determined whether the interference pigments obtained change their colour as a function of the viewing angle, i.e. have a so-called colour flop. If this is desired, a relatively high layer thickness of about 100 nm or more should preferably be set.

The layer thickness of the layers of high-refractive-index material having a refractive index of n>1.8 is set to values of between 10 and 300 nm and in particular between 30 and 200 nm.

The high- and low-refractive-index layers are preferably applied by wet-chemical methods known from the prior art, which have been described, for example, in the following publications: DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017.

The interference pigment according to the invention having a metal oxide, metal oxide hydrate, $MgF_2$ or BiOCl layer can thus be prepared by a process in which a flake-form inorganic substrate is suspended in water, a water-soluble inorganic metal compound is added, and a pH at which the corresponding metal oxide hydrate, $MgF_2$ or BiOCl is deposited on the substrate surface is set and kept constant, a water-soluble inorganic titanium compound and a water-soluble inorganic iron compound in a molar ratio of 1:0.05 to 1:1, based on the oxides $TiO_2$ and $Fe_2O_3$, are added simultaneously to the suspension at a temperature of 50 to 100° C. and a pH kept constant in the range from 1.4 to 4.0, during which the corresponding oxide hydrates are deposited on the substrate surface as a mixture, the coated substrate is separated off and, if desired, washed and dried, and thermally treated at temperatures in the range from 500° C. to 1200° C. under reducing conditions.

If the interference pigment according to the invention comprises a layer package comprising a layer of non-absorbent material having a refractive index of $n \leq 1.8$ and a layer of non-absorbent material having a refractive index of n>1.8, it can be prepared in the following manner:

A flake-form inorganic substrate, which may be coated with one or more layers of metal oxides, metal oxide hydrates, $MgF_2$ or BiOCl, is suspended in water, a water-soluble inorganic titanium compound and a water-soluble inorganic iron compound in a molar ratio of 1:0.05 to 1:1, based on the oxides $TiO_2$ and $Fe_2O_3$, are added simultaneously to the suspension at a temperature of 50 to 100° C. and a pH kept constant in the range from 1.4 to 4.0, during which the corresponding oxide hydrates are deposited on the substrate surface as a mixture, the coated substrate is separated off and, if desired, washed and dried and thermally treated at temperatures in the range from 500° C. to 1200° C. under reducing conditions; the pigment obtained is re-suspended in water and coated alternately with in each case at least one non-absorbent metal oxide hydrate or metal fluoride having a refractive index of $n \leq 1.8$ and at least one non-absorbent metal oxide hydrate or BiOCl having a refractive index of n>1.8 by addition of the corresponding inorganic metal compounds, during which a pH at which the corresponding metal oxide hydrate, BiOCl or metal fluoride precipitates is set and kept constant; the pigment coated in this way is subsequently separated off, dried and, if desired, calcined.

If a second $FeTiO_3$-containing layer is applied, this is advantageously carried out by the same process and under the same conditions as the application of the first $FeTiO_3$-containing layer. The application of this layer is carried out either directly after the above-mentioned drying or after the calcination. It is preferred to apply the second $FeTiO_3$-containing layer without a prior calcination step.

If further layers of organic or inorganic coloured pigments, such as coloured metal oxides, for example goethite, magnetite, haematite, chromium oxide, titanium suboxides and chromium/iron mixed oxides, or coloured pigments, such as Berlin Blue, Turnbull's Blue, bismuth vanadate, chromium hydroxide, cobalt aluminate, ultramarine, Thénard's Blue, cadmium sulfides or selenides, chromate pigments or carbon black, or alternatively organic coloured pigments, such as indigo, thioindigo and derivatives thereof, azo pigments, phthalocyanines, benzimidazoles, anthraquinones, indanthrene dyes, perinones, quinacridones, metal chalcogenides, metal chalcogenide hydrates or Carmine Red, are additionally applied to the pigment according to the invention on the upper layer, the powder colour of the pigments can be significantly modified, enabling further interesting colour effects to be achieved.

These layers are applied by means of known methods, as described, for example, in EP 0 141 173, EP 0 332 071, DE 19 51 696, DE 19 51 697, DE 23 13 332 and DE 40 09 567.

The finished pigment may also be subjected to post-treatment or post-coating in order to increase its light, weather or chemical stability or in order to simplify handling of the pigment, in particular with respect to incorporation into various media. Post-coating or post-treatment methods are known, for example, from DE 22 15 191, DE 31 51 354, DE 32 35 017, DE 33 34 598, DE 40 30 727, EP 0 649 886, WO 97/29059, WO 99/57204 or U.S. Pat. No. 5,759,255.

The substances applied here merely comprise a proportion by weight of 0.1 to 5% by weight, preferably 0.5 to 3% by weight, of the total pigment.

The pigments according to the invention can be employed in a conventional manner for the pigmenting of paints, coatings, printing inks, plastics, cosmetic formulations, ceramic materials, paper and glasses and in the various security applications. The pigments according to the invention are furthermore also suitable for the laser marking of paper and plastics, for applications in the agricultural sector, and for the preparation of pigment compositions, such as, for example, pearlets, pastes and suspensions, and dry preparations, such as, for example, pellets, granules, chips, etc., which are preferably used in printing inks and surface coatings. The pigments according to the invention are particularly suitable for use in automotive and industrial coatings. They can likewise be employed in a multiplicity of known binders used in colour systems and can be used both in aqueous systems and also in solvent-based systems.

The pigments in accordance with the present invention are of course advantageously also miscible with organic dyes, organic pigments and all types of other inorganic single- or multilayered pigments, such as, for example, the conventional pearlescent pigments based on phyllosilicates, glass, $SiO_2$ or metal substrates, and also with holographic pigments or LCPs (liquid crystal polymers) and can be used jointly therewith. Blending with conventional binders and fillers in any ratio is also possible.

The pigments according to the invention comprise a layer structure in which the thickness and composition of each individual layer can be controlled and set precisely. The individual layers are applied homogeneously and smoothly, so that interference phenomena are predictable and specific matching of composition and thickness of the individual layers can take place. The pigments according to the invention therefore have high hiding power, high lustre, clear and intense interference colours and, if desired, a colour which changes with the viewing angle (colour flop). These advantageous properties are particularly pronounced in the case of the pigments according to the invention having a silver-grey mass tone.

The special process for the preparation of the pigments according to the invention enables, in particular, the properties of the $FeTiO_3$-containing layer to be influenced advantageously. The joint precipitation of the titanium and iron compounds results in the entire layer being of high-quality homogeneous composition and the subsequent reduction reaction taking place distributed throughout the layer and not only at a phase boundary. The thickness of the $FeTiO_3$-containing layer can thus be increased and its absorption capacity and colour, but at the same time also the colour of the pigment as a whole, can thus be determined readily. The composition of the $FeTiO_3$-containing layer can be controlled via the molar ratio of the starting substances. In contrast to the prior art, potentially interfering discolouration of the layer resulting from unreacted $Fe_2O_3$ therefore does not have to be accepted. However, if a plurality of phases should form on application of the layers owing to unfavourable mixing ratios, these are in the form of a very homogeneous mixture and not in the form of a gradient and in this way can be controlled better optically.

The following examples are intended to explain the invention in greater detail, but without restricting it.

EXAMPLE 1

Preparation of a Pigment Having the Composition mica/$TiO_2$/$FeTiO_3$ 100 g of mica having a particle size of 10-60 μm are heated to 75° C. with stirring in 2 l of demineralised water.

The pH of the suspension is then adjusted to 1.8 using 18% hydrochloric acid. A 30% titanium tetrachloride solution (161 g of $TiCl_4$ solution w=60% dissolved in 161 g of demineralised water) is then metered in, during which the pH is kept constant by simultaneous dropwise addition of 32% sodium hydroxide solution.

After the addition is complete, the mixture is stirred for a further 15 min.

An aqueous solution of $FeCl_3$, $AlCl_3$ and $TiCl_4$ (34 g of $TiCl_4$ solution w=60% dissolved in 34 g of demineralised water are stirred with 50 g of $FeCl_3$ solution w=12% of Fe, and 4 g of $AlCl_3 \cdot 6H_2O$ are dissolved therein) is subsequently metered in. During this addition, the pH of 1.8 is kept constant by simultaneous dropwise addition of 32% sodium hydroxide solution.

The mixture is again stirred for a further 15 min.

The product is filtered off, washed, dried and calcined at 900° C. under reducing conditions ($N_2$/$H_2$ forming gas) and sieved through a 100 μm sieve.

The pigment exhibits a lustrous dark silver-grey hue as mass tone and a silver interference colour and has high hiding power.

EXAMPLE 2

Preparation of a Pigment Having the Composition mica/$TiO_2$/$FeTiO_3$/$SiO_2$/$TiO_2$/$FeTiO_3$ 100 g of mica having a particle size of 10-60 μm are heated to 75° C. with stirring in 2 l of demineralised water.

The pH of the suspension is then adjusted to 1.8 using 18% hydrochloric acid. A 30% titanium tetrachloride solution (161 g of $TiCl_4$ solution w=60% dissolved in 161 g of demineralised water) is then metered in, during which the pH is kept constant by simultaneous dropwise addition of 32% sodium hydroxide solution.

After the addition is complete, the mixture is stirred for a further 15 min.

An aqueous solution of $FeCl_3$, $AlCl_3$ and $TiCl_4$ (34 g of $TiCl_4$ solution w=60% dissolved in 34 g of demineralised water are stirred with 50 g of $FeCl_3$ solution w=12% of Fe, and 4 g of $AlCl_3 \cdot 6H_2O$ are dissolved therein) is subsequently metered in. During this addition, the pH of 1.8 is kept constant by simultaneous dropwise addition of 32% sodium hydroxide solution.

The mixture is again stirred for a further 15 min.

The product is filtered off, washed, dried, calcined at 900° C. under reducing conditions ($N_2$/$H_2$ forming gas) and sieved through a 100 μm sieve.

The pigment is then again heated to 75° C. with stirring in 2 l of demineralised water.

The pH is subsequently adjusted to 7.5 using 32% sodium hydroxide solution. A sodium water-glass solution (187 g of sodium water-glass solution, comprising 27% of $SiO_2$, are dissolved in 187 g of demineralised water) is then metered in, during which the pH is kept constant at 7.5 by simultaneous dropwise addition of 18% hydrochloric acid. After the addition is complete, the mixture is stirred for a further 0.5 h.

The pH of the suspension is then adjusted to 1.8 using 18% hydrochloric acid. A 30% titanium tetrachloride solution (161 g of $TiCl_4$ solution w=60% dissolved in 161 g of demineralised water) is then metered in, during which the pH is kept constant by simultaneous dropwise addition of 32% sodium hydroxide solution.

After the addition is complete, the mixture is stirred for a further 15 min.

An aqueous solution of $FeCl_3$, $AlCl_3$ and $TiCl_4$ (34 g of $TiCl_4$ solution w=60% dissolved in 34 g of demineralised water are stirred with 50 g of $FeCl_3$ solution w=12% of Fe, and 4 g of $AlCl_3 \cdot 6H_2O$ are dissolved therein) is subsequently metered in. During this addition, the pH of 1.8 is kept constant by simultaneous dropwise addition of 32% sodium hydroxide solution.

The mixture is again stirred for a further 15 min.

The product is filtered off, washed, dried, calcined at 900° C. under reducing conditions ($N_2$/$H_2$ forming gas) and sieved through a 100 μm sieve.

The pigment exhibits a silver interference colour with very high lustre and hiding power and a pale silver-grey mass tone.

EXAMPLE 3

Preparation of a Pigment Having the Composition mica/$FeTiO_3$/$SiO_2$/$TiO_2$ 100 g of mica having a particle size of 10-60 μm are heated to 75° C. with stirring in 2 l of demineralised water.

The pH of the suspension is then adjusted to 1.8 using 18% hydrochloric acid. An aqueous solution of $FeCl_3$, $AlCl_3$ and $TiCl_4$ (34 g of $TiCl_4$ solution w=60% dissolved in 34 g of demineralised water are stirred with 50 g of $FeCl_3$ solution w=12% of Fe, and 4 g of $AlCl_3 \cdot 6H_2O$ are dissolved therein) is then metered in. During this addition, the pH of 1.8 is kept constant by simultaneous dropwise addition of 32% sodium hydroxide solution.

The mixture is stirred for a further 15 min.

The product is filtered off, washed, dried, calcined at 900° C. under reducing conditions ($N_2/H_2$ forming gas) and sieved through a 100 μm sieve.

The pigment is then again heated to 75° C. with stirring in 2 l of demineralised water.

The pH is subsequently adjusted to 7.5 using 32% sodium hydroxide solution. A sodium water-glass solution (187 g of sodium water-glass solution, comprising 27% of $SiO_2$, are dissolved in 187 g of demineralised water) is then metered in, during which the pH is kept constant at 7.5 by simultaneous dropwise addition of 18% hydrochloric acid. After the addition is complete, the mixture is stirred for a further 0.5 h.

The pH of the suspension is then adjusted to 1.8 using 18% hydrochloric acid. A 30% titanium tetrachloride solution (161 g of $TiCl_4$ solution w=60% dissolved in 161 g of demineralised water) is then metered in, during which the pH is kept constant by simultaneous dropwise addition of 32% sodium hydroxide solution.

After the addition is complete, the mixture is stirred for a further 15 min.

The product is filtered off, washed, dried, calcined at 900° C. under reducing conditions and sieved through a 100 μm sieve.

The pigment obtained exhibits a silver interference colour with high lustre and hiding power and a silver-grey mass tone.

EXAMPLE 4

Preparation of a Pigment Having the Composition mica/$FeTiO_3$ 100 g of mica having a particle size of 10-60 μm are heated to 75° C. with stirring in 2 l of demineralised water.

The pH of the suspension is then adjusted to 1.8 using 18% hydrochloric acid. An aqueous solution of $FeCl_3$, $AlCl_3$ and $TiCl_4$ (34 g of $TiCl_4$ solution w=60% dissolved in 34 g of demineralised water are stirred with 50 g of $FeCl_3$ solution w=12% of Fe, and 4 g of $AlCl_3*6H_2O$ are dissolved therein) is then metered in. During this addition, the pH of 1.8 is kept constant by simultaneous dropwise addition of 32% sodium hydroxide solution.

The mixture is stirred for a further 15 min.

The product is filtered off, washed, dried, calcined at 900° C. under reducing conditions analogously to Example 1 and sieved through a 100 μm sieve.

The pigment exhibits a silver interference colour and a silver-grey mass tone and has very high hiding power.

EXAMPLE 5

Preparation of a Pigment Having the Composition mica/$FeTiO_3$ 100 g of mica having a particle size of 10-60 μm are heated to 75° C. with stirring in 2 l of demineralised water.

The pH of the suspension is then adjusted to 1.8 using 18% hydrochloric acid. An aqueous solution of $FeCl_3$, $AlCl_3$ and $TiCl_4$ (168 g of $TiCl_4$ solution w=60% dissolved in 168 g of demineralised water are stirred with 245 g of $FeCl_3$ solution w=12% of Fe, and 20 g of $AlCl_3*6H_2O$ are dissolved therein) is then metered in. During this addition, the pH of 1.8 is kept constant by simultaneous dropwise addition of 32% sodium hydroxide solution.

The mixture is stirred for a further 15 min.

The product is filtered off, washed, dried, calcined at 900° C. under reducing conditions analogously to Example 1 and sieved through a 100 μm sieve.

The pigment exhibits a golden interference colour and a silver-grey mass tone and has very high hiding power.

EXAMPLE 6

Preparation of a Pigment Having the Composition mica/$FeTiO_3$ with an Excess of $TiO_2$ 100 g of mica having a particle size of 10-60 μm are heated to 75° C. with stirring in 2 l of demineralised water.

The pH of the suspension is then adjusted to 1.8 using 18% hydrochloric acid. An aqueous solution of $FeCl_3$, $AlCl_3$ and $TiCl_4$ (172 g of $TiCl_4$ solution w=60% dissolved in 172 g of demineralised water are stirred with 49 g of $FeCl_3$ solution w=12% of Fe, and 4 g of $AlCl_3*6H_2O$ are dissolved therein) is then metered in. During this addition, the pH of 1.8 is kept constant by simultaneous dropwise addition of 32% sodium hydroxide solution.

The mixture is stirred for a further 15 min.

The product is filtered off, washed, dried, calcined at 900° C. under reducing conditions analogously to Example 1 and sieved through a 100 μm sieve.

The pigment exhibits a lustrous, silver interference colour and a pale, silver-grey mass tone and has high hiding power.

EXAMPLE 7

Comparative Example

Preparation of a Pigment Having the Composition mica/$FeTiO_3$ with a Concentration Gradient 100 g of mica having a particle size of 10-60 μm are heated to 75° C. with stirring in 2 l of demineralised water.

The pH of the suspension is then adjusted to 1.8 using 18% hydrochloric acid. A 30% titanium tetrachloride solution (172 g of $TiCl_4$ solution w=60% dissolved in 172 g of demineralised water) is then metered in, during which the pH is kept constant by simultaneous dropwise addition of 32% sodium hydroxide solution.

After the addition is complete, the mixture is stirred for a further 15 min.

The pH of the suspension is subsequently adjusted to 3.0 using 32% sodium hydroxide solution. 49 g of an $FeCl_3$ solution where w=12% of Fe are then metered in, during which the pH is kept constant by simultaneous dropwise addition of 32% sodium hydroxide solution.

After the addition is complete, the mixture is again stirred for a further 15 min.

The product is filtered off, washed, dried, calcined at 900° C. under reducing conditions ($N_2/H_2$ forming gas) and sieved through a sieve.

The pigment obtained exhibits a weakly silver interference colour and a grey-brown mass tone and has high hiding power.

The invention claimed is:

1. A process for producing an interference pigment, comprising a flake-form inorganic substrate and at least one $FeTiO_3$-containing layer thereon, where the $FeTiO_3$ is present in a proportion of 8-100% by weight, based on the total weight of the layer, and is homogeneously distributed in the layer, and at least one further layer of metal oxides, metal oxide hydrates, MgF$_2$ or BiOCl, said process comprising the following steps:

a flake-form inorganic substrate is suspended in water, a water-soluble inorganic metal compound is added, and a pH at which a corresponding metal oxide hydrate, MgF$_2$ or BiOCl is deposited on the substrate surface is set and kept constant, a water-soluble inorganic titanium compound and a water-soluble inorganic iron compound in a molar ratio of 1:0.05 to 1:1, based on the oxides TiO$_2$ and Fe$_2$O$_3$, are added simultaneously to the suspension at a temperature of 50 to 100° C. and a pH kept constant in the range from 1.4 to 4.0, during which the corresponding oxide hydrates of TiO$_2$ and Fe$_2$O$_3$ are deposited on the substrate surface as a mixture, the resultant coated substrate is separated off, optionally washed and dried, and thermally treated at temperatures in the range from 500° C. to 1200° C. under reducing conditions.

2. A process according to claim 1, where the FeTiO$_3$ is present in a proportion of 15-99% by weight.

3. A process according to claim 1, where the FeTiO$_3$ is present in a proportion of 54-99% by weight.

4. A process according to claim 1, where the flake-form inorganic substrate consists of natural or synthetic mica, talc, kaolin, glass flakes, SiO$_2$ or TiO$_2$ flakes, flake-form iron oxide or aluminium oxide, graphite flakes, BiOCl, flake-form holographic pigments or liquid crystal polymers (LCPs).

5. A process according to claim 1, said process further comprising depositing on the FeTiO$_3$ containing layer at least one layer package consisting essentially of a layer of non-absorbent material having a refractive index of n≦1.8 and a layer of non-absorbent material having a refractive index of n>1.8.

6. A process according to claim 5, where the non-absorbent material having a refractive index of n≦1.8 consists essentially of SiO$_2$, SiO(OH)$_2$, Al$_2$O$_3$, AlO(OH), B$_2$O$_3$ or mixtures thereof, or of MgF$_2$.

7. A process according to claim 5, where the non-absorbent material having a refractive index of n>1.8 consists essentially of TiO$_2$, ZrO$_2$, ZnO, SnO$_2$ or mixtures thereof, or of BiOCl.

8. A process according to claim 1, where the FeTiO$_3$-containing layer additionally comprises one or more further metal oxides in an amount of ≦20% by weight, based on the weight of the layer.

9. A process according to claim 8, where the further metal oxide is selected from the group consisting of Al$_2$O$_3$, Ce$_2$O$_3$, B$_2$O$_3$, ZrO$_2$ and SnO$_2$ or mixtures thereof.

10. A process according to claim 5, in which a further FeTiO$_3$-containing layer is applied.

* * * * *

UNITED STATES PATENT AND TRADEMARK OFFICE
CERTIFICATE OF CORRECTION

PATENT NO.       : 7,611,574 B2                              Page 1 of 1
APPLICATION NO.  : 10/555592
DATED            : November 3, 2009
INVENTOR(S)      : Kniess et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twelfth Day of October, 2010

David J. Kappos
*Director of the United States Patent and Trademark Office*